(No Model.)
E. C. HOFFMAN.
SPRING GEAR FOR VEHICLES.
No. 562,399. Patented June 23, 1896.
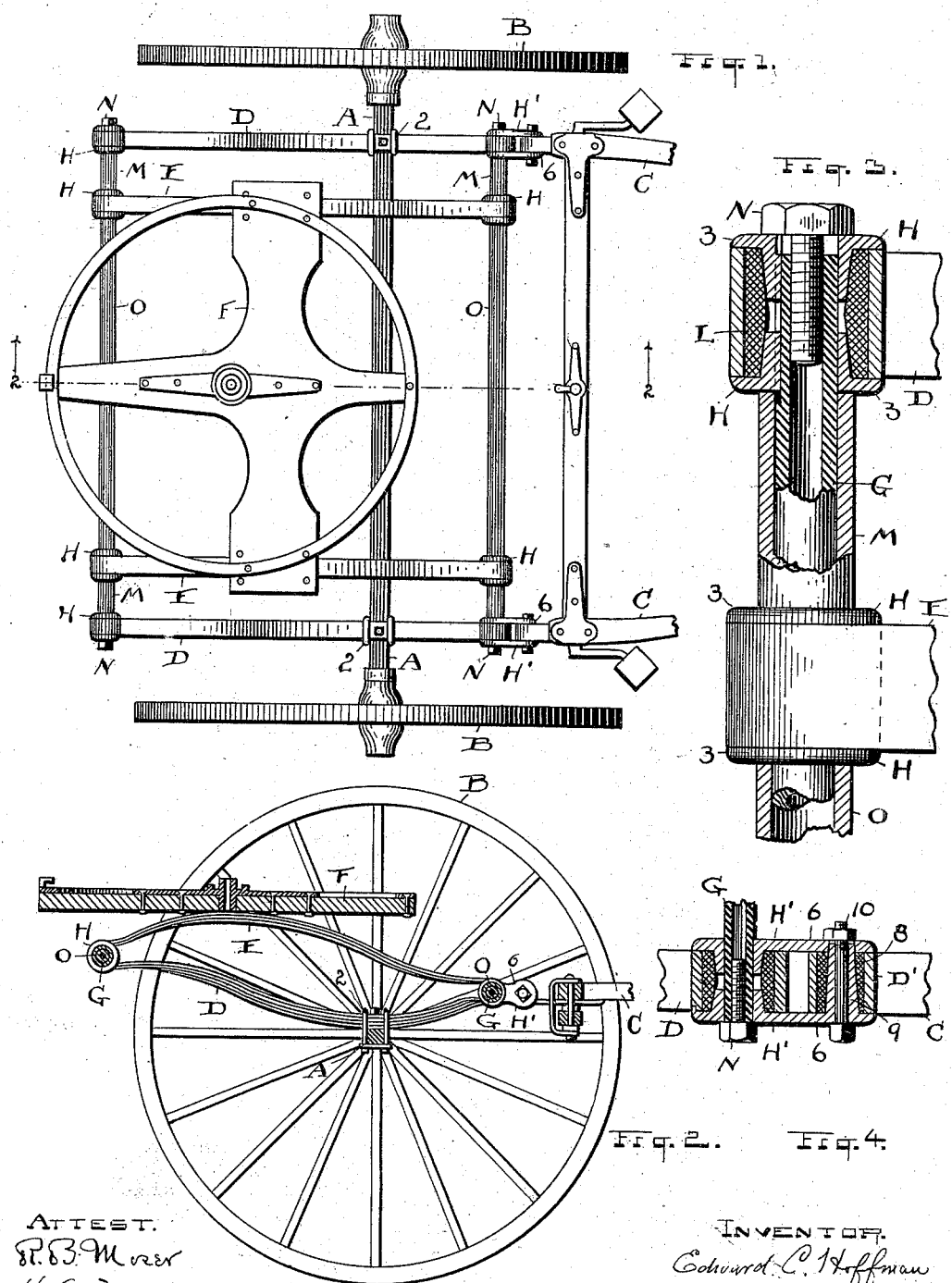
ATTEST.
INVENTOR.
Edward C. Hoffman
By H. T. Fisher ATT'Y

UNITED STATES PATENT OFFICE.

EDWARD C. HOFFMAN, OF CLEVELAND, OHIO.

SPRING-GEAR FOR VEHICLES.

SPECIFICATION forming part of Letters Patent No. 562,399, dated June 23, 1896.

Application filed December 9, 1895. Serial No. 571,468. (No model.)

*To all whom it may concern:*

Be it known that I, EDWARD C. HOFFMAN, a citizen of the United States, residing at Cleveland, in the county of Cuyahoga and State of Ohio, have invented certain new and useful Improvements in Gears for Vehicles; and I do hereby declare that the following is a full, clear, and exact description of the invention, which will enable others skilled in the art to which it appertains to make and use the same.

My invention relates to improvements in gears for vehicles, such as wagons and carriages and the like, substantially as shown and described, and particularly pointed out in the claims.

In the accompanying drawings, Figure 1 is a plan view of my improved gear shown in connection with the front wheels and axle and part of the shafts of a vehicle, the body of the vehicle being removed in order to more clearly disclose the construction and relation of the parts. Fig. 2 is a vertical sectional elevation on line 2 2, Fig. 1. Fig. 3 is an enlarged view of a section of one corner of the gear, taken, say, from the upper left-hand corner in Fig. 1, and partly in horizontal section, and all as hereinafter more fully described. Fig. 4 is a horizontal sectional plan view of a portion of my improved gear, taken from the lower right-hand corner of the gear as seen in Fig. 1, and also as hereinafter more fully described.

The objects of my invention are simplicity and economy in construction and greater utility and advantage in operation by reason of my arrangement of parts. Improved spring action and greater convenience in turning a vehicle in crowded streets are among the immediate advantages.

A represents the axles, B the wheels, and C the shafts or thills. If a heavy wagon be used, these shafts might of course be substituted by a pole for a double team.

I have preferably shown my invention in connection with the front portion of a vehicle, but it is equally well adapted to the rear portion thereof.

The said gear is shown with four separate but jointly-acting springs D and D and E and E. The springs D D are set longitudinally of the vehicle and are secured to the axle A by clips 2 or other equivalent means forward of their middle portion, substantially as shown, so as to throw the body of the said springs well to the rearward of the axle. The peculiar double reverse curvature of the spring likewise contributes to this result. All the weight upon the body at the front comes through these springs D upon the axle, as shown, and between the bed F of the fifth-wheel and said springs D are the springs E. These springs E are the same shape as springs D, but reversely placed and removed some distance inward from the springs D toward the center of the wagon, so that they occupy a wholly different vertical plane, and the flat base F for the fifth-wheel is supported on the springs E near their inner ends in the same position relatively as the springs D upon the axle A, so that the support for the fifth-wheel comes some distance back of the axle. This brings the pivot or turning point well to the rear of the axle, as seen in Fig. 2, and thus enables me to turn the vehicle short around.

Now in order to simplify the construction I employ two tubes G as supports for both sets of springs, and forming the front and rear of the gear-frame. These tubes may be, for example, ordinary gas-pipe or the like, and the ends of the springs D and E are fixed thereon in like manner. Thus each spring fastening or bearing has a set of thimbles H, as shown in Fig. 3. These thimbles are adapted to fit snugly over the pipe or tube G, and are slightly tapered on their outside from their flanges 3 inward, and are of such depth as not to touch one another when placed in position, thus leaving room for adjustment to take up wear. About these thimbles I place a leather sleeve L, occupying the full width between the flanges 3 of the thimbles, and forming the immediate bearing for the spring D or E, as the case may be. In this case we will assume that it represents the spring D, but the description would apply as well to the spring E. The flexible sleeve L is the same width as the spring D, and being of leather forms a noiseless and serviceable bearing which can be replaced when worn out. The thimbles H are kept in working position by the headed screw N, threaded into the ends of tube G, and bearing against the outer thimble. Sleeves M are placed between the bearings of the springs D and E, and a long sleeve O is placed on the tube G between the bearings of the inner springs E. Similar screws N are employed at each end of the tubes G, and it will be noticed in Fig. 3 that there is not only space between the two thimbles H to take up any wear that may occur in the spring-bearing at this point, but that the outer thimble extends out somewhat beyond the ends of tubes G, thus leaving room at that point also to screw up the parts and take up wear that may occur from any cause. The only screws used in the entire gear are those at the ends of tubes G, and by removing either one of the said screws N the corresponding tube and all the parts connected therewith may be separated and removed.

The same construction identically appears at the front of the gear with the exception in this instance of a modification of the thimbles H. In this case in order to make an easy and convenient connection for the thills C the thimbles H' are provided with forward extensions 6, between which the thills are secured, as shown. A leather tubular bearing 8, corresponding to the bearing L above described, is also employed here, and is engaged over the tapered sleeve 9, upon which the thill or coupling iron D' is secured. This sleeve 9 projects inward from one of the side bars or pieces 6, though it might be a separate sleeve, and a bolt 10 fastens the parts together. If preferred, a connection might be made for the thills with the gear independent of thimbles H', and the modification shown in Fig. 4 is the only difference which exists in the front and rear spring-bearings of the gear. Thus I produce what may be termed a "low knockdown gear," all the parts of which can be economically produced and assembled, and which make a very serviceable gear for every-day use in express-wagons, delivery-wagons, carriages, and the like.

In thill or pole couplings it is very desirable to have a quiet connection, so that there will be no rattling or other noise, and by the construction shown a perfectly noiseless and serviceable connection is effected.

It will be noticed that as the fifth-wheel is supported on bed F and the bed F directly and only upon the side spring E, a very wide fifth-wheel is afforded and one which gives such width of rest for the body of the vehicle as to insure a very steady support against any and all lateral strain. It will also be observed that the connection of bed F, carrying the fifth-wheel with side springs E, is wholly at the rear of axle A and on the rear portion of the said spring E. This brings the kingbolt far to the rear of the axle A and promotes the short easy turning of the wheel hereinbefore described.

What I claim is—

1. The gear described having tubes at front and rear to support the springs and thimbles sleeved on said tubes and forming bearings for the ends of the springs, substantially as described.

2. A gear for vehicles having laterally-arranged tubes and longitudinal springs, and a pair of thimbles for each end of said springs sleeved on said tubes and forming bearings for the springs, substantially as described.

3. The spring-bearings described consisting of the inner tube, the tapered and flanged thimbles thereon, the flexible sleeve about said thimbles and the springs secured on said bearings, substantially as described.

4. The gear described, having transverse tubes, the springs, thimbles on said tubes forming bearings for the springs, sleeves between said thimbles on the tube, and screws to tighten up the parts, substantially as described.

5. In vehicles, a gear comprising parallel cross-tubes front and rear of the axle, bottom springs resting on the axle and supporting said tubes at their ends, and reversely-bent top springs parallel with the bottom springs and engaging said tubes in a different vertical plane from the said bottom springs, thimbles on said tubes engaged by said springs the rest for the fifth-wheel resting on said top springs and the fifth-wheel on said base and overlapping said top springs, substantially as described.

6. The gear described comprising the wheels and the axle, in combination with the parallel tubes front and rear of the axle, and supporting-springs at the ends of said tubes, the separate top springs engaging said tubes at their ends, the thimbles for securing said springs to said tubes, and the sleeves on the said tubes between the thimbles, substantially as described.

7. The combined gear and thill-coupling, consisting of the side parts H' H', having thimbles for engagement with the gear and forward extensions 6, the thill-iron supported between said extensions 6 at their front, and means to clamp and hold the said iron therein, substantially as described.

8. The gear and thill-coupling described, consisting of the parts H', H', one of said parts having a tapered inward projection forming a support for the thill-iron, a tapered bearing-tube over said projection and a thill-iron engaged over said bearing-tube, said parts clamped together, in combination with the tube G on which parts H' H' are sleeved substantially as described.

Witness my hand to the foregoing specification on this 27th day of November, 1895.

EDWARD C. HOFFMAN.

Witnesses:
H. T. FISHER,
H. E. MUDRA.